(12) United States Patent
Kearsey et al.

(10) Patent No.: US 7,467,152 B2
(45) Date of Patent: Dec. 16, 2008

(54) QUERY GENERATOR

(75) Inventors: Natascha Kearsey, Bristol (GB); Stephen David Cave, Gloucester (GB); Andrew Osborn, Hotwells (GB); Robert Lloyd Lavender, Nr Wedmore (GB); Kathryn Nash, Bradlow Ledbury (GB); Paolo Fragapane, Henleaze (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/730,826

(22) Filed: Dec. 7, 2000

(65) Prior Publication Data

US 2002/0010695 A1 Jan. 24, 2002

(30) Foreign Application Priority Data

Mar. 16, 2000 (EP) .................................. 00302134

(51) Int. Cl.
*G06F 17/30* (2006.01)
(52) U.S. Cl. ............................ 707/102; 707/101; 707/2
(58) Field of Classification Search .................... 707/2, 707/3, 4, 5, 6, 9
See application file for complete search history.

(56) References Cited

U.S. PATENT DOCUMENTS

| | | | | | |
|---|---|---|---|---|---|
| 5,412,804 | A | * | 5/1995 | Krishna | 707/2 |
| 5,713,020 | A | * | 1/1998 | Reiter et al. | 707/102 |
| 5,761,654 | A | * | 6/1998 | Tow | 707/2 |
| 5,781,896 | A | * | 7/1998 | Dalal | 707/2 |
| 5,832,485 | A | * | 11/1998 | Chaudry | 707/9 |
| 5,850,547 | A | * | 12/1998 | Waddington et al. | 718/102 |
| 5,991,754 | A | * | 11/1999 | Raitto et al. | 707/2 |
| 6,016,488 | A | | 1/2000 | Bosworth et al. | 707/4 |
| 6,023,695 | A | * | 2/2000 | Osborn et al. | 707/3 |
| 6,023,696 | A | * | 2/2000 | Osborn et al. | 707/3 |
| 6,064,999 | A | * | 5/2000 | Dalal | 707/2 |
| 6,125,360 | A | * | 9/2000 | Witkowski et al. | 707/2 |
| 6,134,543 | A | * | 10/2000 | Witkowski et al. | 707/2 |
| 6,212,515 | B1 | * | 4/2001 | Rogers | 707/2 |
| 6,249,791 | B1 | * | 6/2001 | Osborn et al. | 707/200 |
| 6,345,272 | B1 | * | 2/2002 | Witkowski et al. | 707/4 |
| 6,438,541 | B1 | * | 8/2002 | Witkowski | 707/4 |
| 6,449,605 | B1 | * | 9/2002 | Witkowski | 707/3 |
| 6,449,606 | B1 | * | 9/2002 | Witkowski | 707/3 |
| 6,449,609 | B1 | * | 9/2002 | Witkowski | 707/4 |
| 6,477,525 | B1 | * | 11/2002 | Bello et al. | 707/3 |
| 6,496,819 | B1 | * | 12/2002 | Bello et al. | 707/3 |
| 6,581,055 | B1 | * | 6/2003 | Ziauddin | 707/4 |
| 6,609,131 | B1 | * | 8/2003 | Zait et al. | 707/100 |
| 6,678,676 | B2 | * | 1/2004 | Brickell | 707/3 |

OTHER PUBLICATIONS

Chaudhuri S. et al., "Optimizing Queries With Aggregate Views", International Conference On Extending Database Technology Proceedings, Mar. 25, 1996, pp. 167-182.

Goel P. et al., "SQL query Optimization: Reordering for a General Class of Queries", 1996 ACM SIGMOD International Conference on Management of Data, Montreal, Que., Canada, Jun. 4-6, 1996, vol. 25, No. 2, pp. 47-56.

* cited by examiner

*Primary Examiner*—Sana Al-Hashemi
(74) *Attorney, Agent, or Firm*—Hanify & King, P.C.

(57) ABSTRACT

The present invention relates to a query generator for generating a query for obtaining selected data from a database. The query generator includes a processor which is adapted to receive an input indicating the selected data to be obtained. The processor then analyses the input to determine whether the input requires a joining of data in different tables, and an aggregation step. If so, the processor generates a query which causes the database to aggregate the data within each of the tables as required; and, join the aggregated data, the joined aggregated data representing the selected data.

20 Claims, 5 Drawing Sheets

QUERY GENERATOR

FIELD OF THE INVENTION

The present invention relates to apparatus for generating a query for obtaining selected data from a database and to a database system including a database, and a query generator.

DESCRIPTION OF THE PRIOR ART

Query generators, such as Oracle's "Discoverer" software package, are end user tools which are used to generate queries which can be sent to a database so as to obtain data from the database. Users construct database queries by selecting items from a drop down list of items displayed on the screen. Each item represents different information which can be obtained from the database, such as the raw data, or alternatively the calculation of various values, such as the sum or average of the selected data. Once the items have been selected, the query generator then generates a query in a structured query language (SQL) which can be transferred to the database causing the database to output the desired data.

In many cases the SQL required for any given combination of items selected by the user is non-ambiguous, and the users see the results they expect, based on the items selected. However there are combinations of items which the normal SQL generation algorithms of the query generators are unable to handle. This causes SQL to be generated that yields results which although relationally correct, are not what the user actually required to see. Typically, this occurs when the selected items require the calculation of aggregates of the data and the joining of data stored in different tables. Specific examples of such queries will be described in more detail below.

Currently, there are a number of options available for handling such problems.

In one example, rather than present data to the user which is likely to be mis-interpreted, such classes of queries are prevented from being run at all. Other products either present the misleading data without any warning, or require an Administrator to set up complex folder structures within the database in order to generate the correct results.

SUMMARY OF THE INVENTION

In accordance with a first aspect of the present invention, we provide a query generator for generating a query for obtaining selected data from a database, the database having a number of tables in which data is stored, the query generator comprising a processor which is coupled to the database in use, the processor being adapted to:
  a. receive an input indicating the selected data to be obtained;
  b. analyse the input and determine whether the input requires a joining of data in different tables, and an aggregation step; and,
  c. if so, causing the processor to generate a query, the query being adapted to cause the database to:
    i. aggregate the data within each of the tables as required; and,
    ii. join the aggregated data, the joined aggregated data representing the selected data.

In accordance with a second aspect of the present invention, we provide a database system, the database system comprising:
  a. a database, the database comprising:
    i. a store for storing data; and,
    ii. a database processor coupled to the store for obtaining data in accordance with a received query; and,
  b. a query generator for generating a structured query for obtaining selected data from the database, the query generator comprising a processor adapted to:
    i. receive an input representing the query to be generated;
    ii. analyse the input and determine whether the input requires a joining of data in different tables, and an aggregation step; and,
    iii. if so, causing the processor to generate a structured query,
  wherein the database processor responds to the structured query to:
    (1) aggregate the data within each of the tables as required; and,
    (2) join the aggregated data, the joined aggregated data representing the selected data.

Accordingly, the present invention provides a query generator, and a database including a query generator which is capable of generating a query which does not suffer from the above mentioned problem of the prior art. The system operates by detecting that the input will require the joining of data in different tables and an aggregation step, and automatically changes the query generation algorithm to reflect what the user was actually asking for. This ensures that the database outputs the desired data and avoids misleading results without requiring any additional Administration work. The net result is to vastly increase the range of queries that a user can ask of a given database schema, enabling them to get more business intelligence from the same amount of raw data.

The query preferably causes the database to aggregate the data for each table by causing the database to select the data within the table for aggregation and aggregate the data. This ensures that the correct aggregation is performed on the correct data, at the correct level, thereby overcoming the problems associated with first joining the data and then aggregating the data at the wrong level.

The step of selecting the data usually involves selecting the data by implementing complex folders to generate inline views within the database, the inline views being maintained until the aggregation is complete. However, alternatively for example, the database may be adapted to generate new tables including the data with the new tables being used for the aggregation purposes. Once the aggregation has been completed, the new tables could then be joined to provide the desired output.

Typically the aggregation comprises one of an average, a sum, a standard deviation, an evaluation of either a maximum or a minimum of the data. However, any calculation which is performed on a number of rows of data within the table and which results in the output of a single value will also constitute an aggregate for the purposes of the present invention.

The query generator usually further comprises an input device coupled to the processor to allow a user to generate the input. Any form of device may be used but typically, the query generator will be implemented on a computing device, such as a personal computer, a palm top, a lap top, or a wireless device, in which case the input will typically comprise a keyboard or the like. Alternatively however, the input may be generated remotely and transferred to the query generator thereby allowing the query generator to generate the desired query.

Typically the input is generated by selecting items from a list of possible items, each item representing data contained within a respective database table, and/or an action to be performed on data within the database. However, any suitable input form, such as the input of search commands, or any other form of command input may be used.

The query is preferably generated as an SQL query. The structured query language is used by most databases and accordingly, it is necessary in the majority of cases for the query generator to generate queries in the SQL form. However, alternative languages may be used as appropriate to the database.

The aggregation step usually requires the aggregation of data in different tables. Thus for example, it may be required to aggregate budget data from a budget table and sales data from a sales table, with the budget and sales table being joined via a common master account table. Alternatively the aggregation may need to be performed on data at both the master and detail levels. In both these cases, the joining of the tables prior to the aggregation results in the calculation of values which are not what is required by the user. Accordingly the present invention overcomes this by ensuring the correct data is aggregated.

In the system in which a database and a query generator are provided together then the database processor can comprise the processor. This allows a single processor to be employed to generate the query and then use the query to obtain the data from the database. However, separate processors may of course be used, for example, if the database and the query generator are located at different locations.

BRIEF DESCRIPTION OF THE DRAWINGS

Examples of the present invention will now be described with reference to the accompanying drawings, in which.

DETAILED DESCRIPTION OF THE DRAWINGS

Figure 1:
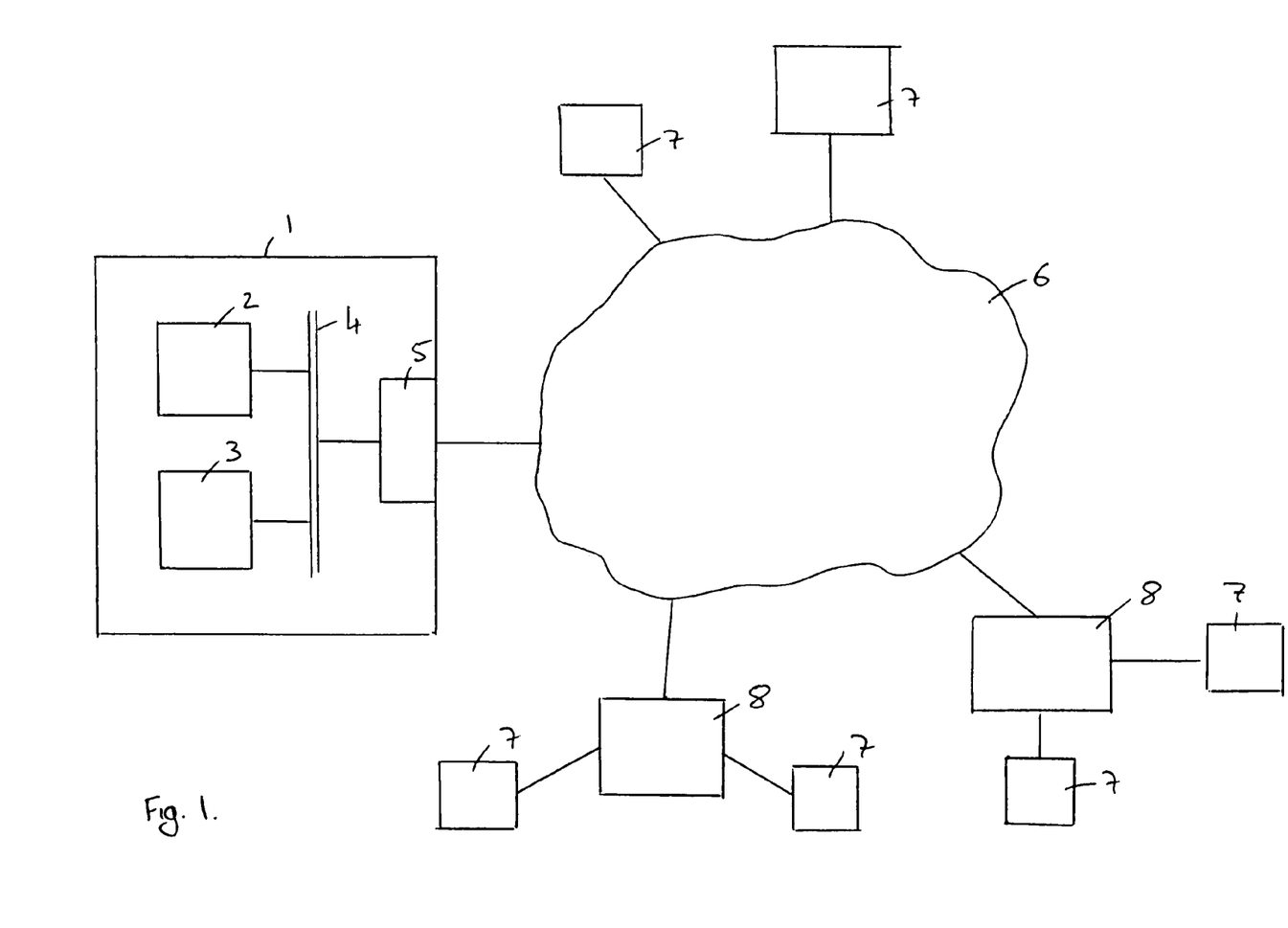
FIG. 1 is an example of a database system incorporating a query generator according to the present invention.

FIG. 1 is a schematic diagram of a typical database system. As shown, the system comprises a database centre 1 which includes a database 2 which stores data for use by the processing system.

The processing centre 1 also includes a processor 3 which is linked to the database 2 via a bus 4. The bus 4 is in turn linked via a communications device 5, such as a modem, ISDN connection, or the like to a communications network 6, such as the Internet or an Ethernet or Token Ring LAN. The communications network 6 is in turn coupled to a number of system user end stations 7, either directly or via a communications centre 8 such as an Internet service provider, in the usual way.

Figure 2:
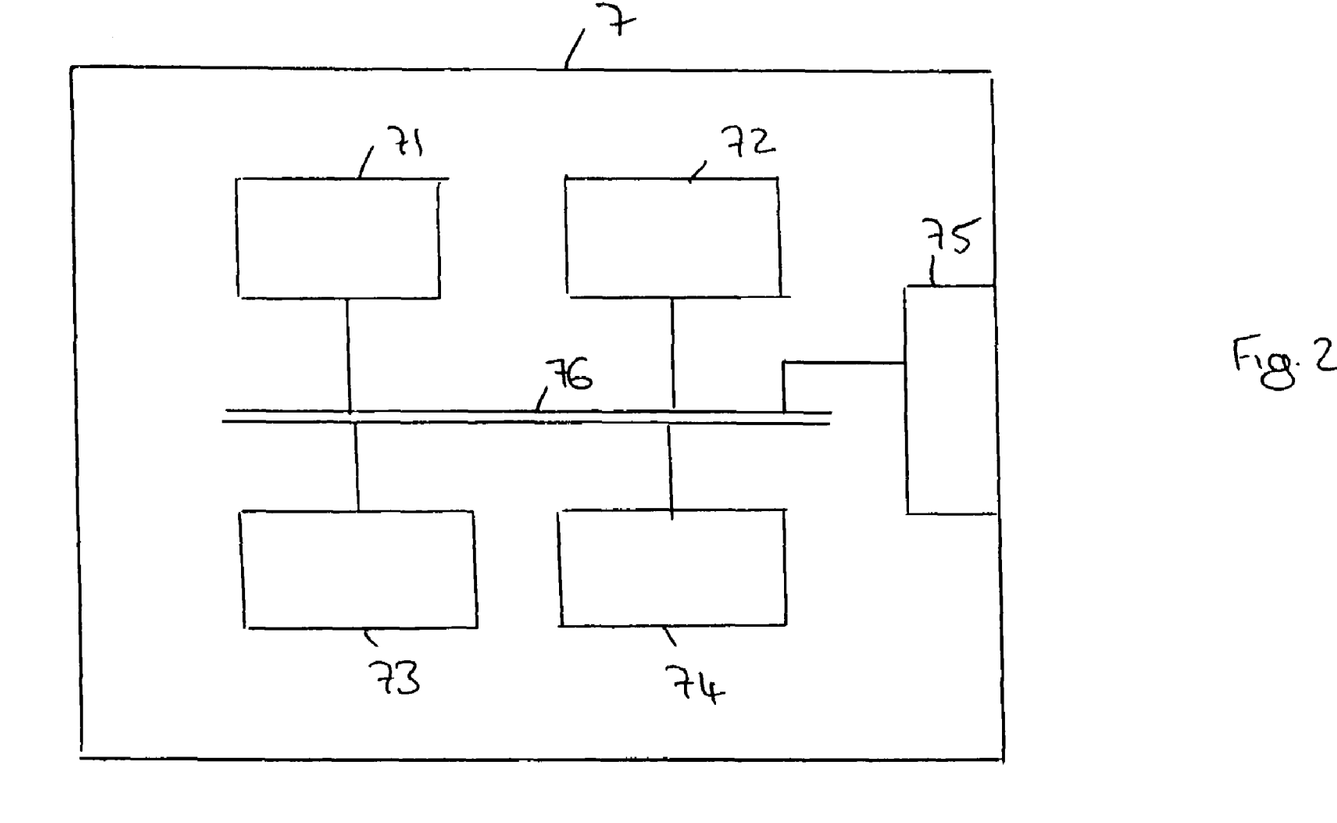
FIG. 2 is a schematic diagram of a query generator according to the present invention.

An example of an end station 7 suitable for use as a query generator is shown in more detail in FIG. 2. As shown, each end station includes an Input/Output device 71, a memory 72, a processor 73, a display 74 and a communications device 75 such as a modem, all of which are coupled together via a bus 76, as shown. It will be appreciated that the end station may therefore comprise a personal computer, a lap top, a palm top, a wireless communications device or the like.

When the processor 73 of the end station 7 is suitably programmed, the end station 7 can be used as a query generator to generate queries which are transferred via the communications network 6 to the database center 1. The processor 3 will respond to the query by downloading the required data from the database 2 and transferring the data via the bus 4, the communications device 5 and the communications network 6 back to the end station 7 for presentation to the user on the display 74.

The query is typically generated by selecting items from a drop down list presented to the user on the display 74. The items in the list will include information concerning the data to be obtained and any operation which is to be carried out on the data. Thus, for example, if the user requires the sum of sales for a given account to be provided, the user will select a sales item, a sum item and an account item. The account item is used to specify the account for which the sales are required and the sum item indicates that the sales values are to be summed.

Operation of the system in accordance with the prior art will now be described.

Figure 3:
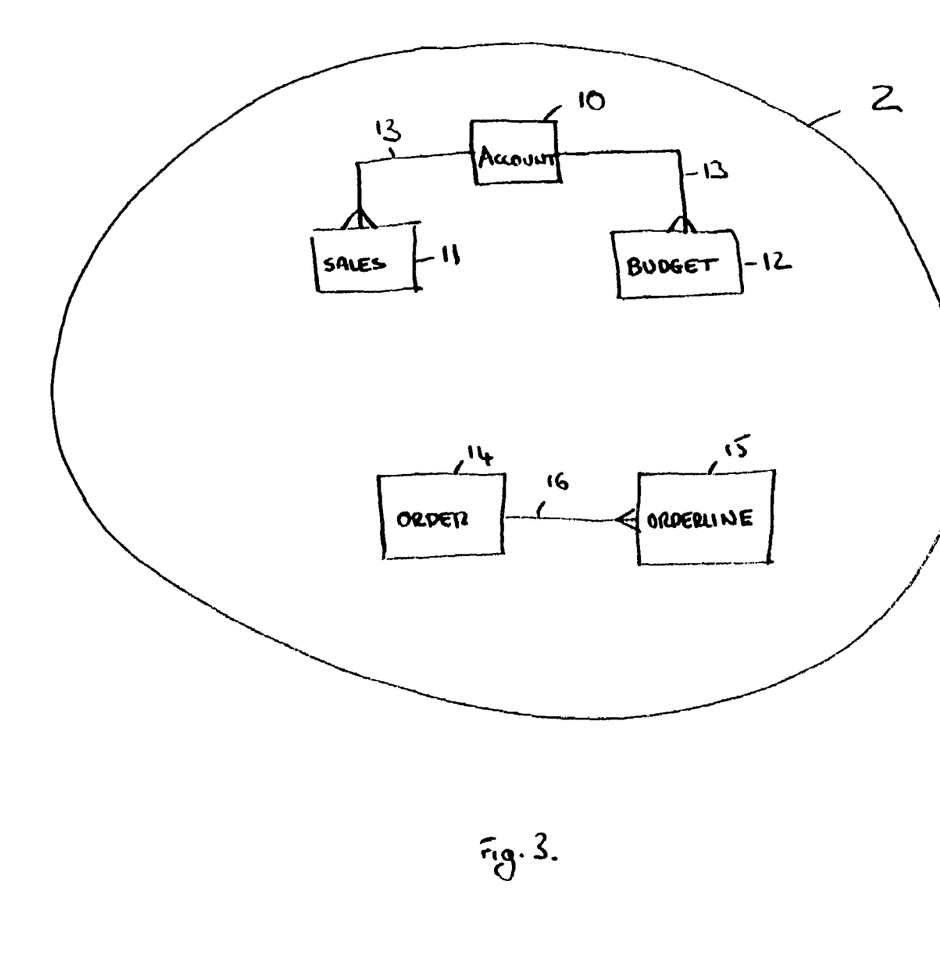
FIG. 3 is a schematic diagram of the database of FIG. 1.

A schematical representation of the database 2 is shown in FIG. 3. In this example, the database 2 is a database including details of a firms financial business. The database therefore includes an accounts table 10 indicating a number of different accounts the company uses. A sales table, indicating the sales for each account and a budget table 12 indicating the budget for each account are also provided. These are linked to the accounts table by appropriate links 13. Similarly, an order table 14 is provided which is linked to appropriate orderline table 15 by links 16. In this example, the accounts table and the order table form master tables as they are subordinate to the sales table 11 and budget table 12, and the orderline table 15 respectively. The sales, budget, and orderline tables form associated detail tables.

In the first example the user of the end station 7 wants to request a sum of sales and a sum of budgets for specified accounts. This therefore involves obtaining aggregate values from two detail tables, namely the sales table 11 and the budget table 12. Accordingly, the user selects items 'Sales' from the sales table, 'Budget' from the Budget table and 'Account name' from the Account table.

In this example, the sales table 11 is as shown in table 1, and the budget table is as shown in table 2.

TABLE 1

| ID | ACCID | SALES |
|----|-------|-------|
| 1  | 1     | 100   |
| 2  | 1     | 100   |
| 3  | 1     | 200   |
| 4  | 2     | 50    |
| 5  | 2     | 80    |
| 6  | 3     | 200   |
| 7  | 4     | 150   |
| 8  | 4     | 50    |
| 9  | 4     | 100   |

[9 rows only selected]

TABLE 2

| ID | ACCID | BUDGET |
|----|-------|--------|
| 1  | 1     | 200    |
| 2  | 1     | 200    |
| 3  | 2     | 100    |
| 4  | 3     | 150    |
| 5  | 3     | 250    |
| 6  | 3     | 350    |
| 7  | 4     | 100    |
| 8  | 4     | 100    |

[8 rows only selected]

The normal behavior of SQL generation tools is to join all the required tables and then compute the results. Accordingly, the processor 73 will operate to generate an SQL query as follows:

select account.name Account, sum(sales), sum(budget)
        from account, sales, budget
    where account.id=sales.accid and account.id=budget.accid group by account.name The SQL query is transferred to the processor 3 of the database center 1. The processor 3 downloads information from the database 2 in accordance with the SQL query and returns the data shown in Table 3 to the end station 7, via the communications network 6.

TABLE 3

| ACCOUNT   | SUM (SALES) | SUM (BUDGET) |
|-----------|-------------|--------------|
| Account 1 | 800         | 1200         |
| Account 2 | 130         | 200          |
| Account 3 | 600         | 750          |
| Account 4 | 600         | 600          |

[4 rows only selected]

Figure 4:
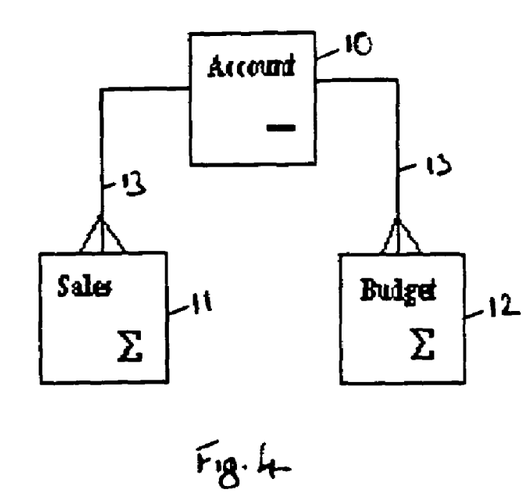
FIG. 4 is a schematic representation of a first query according to the prior art.

The above query is represented diagrammatically in FIG. 4 as shown both the sales table 11 and the budget table 12 are linked via the accounts table 10 using the links 13, as shown, before the aggregation is performed.

As a result of this, although the numbers are relationally correct, they are not meaningful to an end user. In particular, as the sales table 11 and the budget table 12 are linked to the accounts table 10, then the generated SQL causes the tables to be joined before any aggregation is performed. The joins in the SQL cause every row in the Sales table 11 to be joined with every row in the Budgets table 12, for each account.

Accordingly, each row in the sales table 11 for Account 1 is duplicated due to the presence of two Account 1 rows in the budget table 12. As a result, the total Sales for Account1 are shown as 800, being twice the correct amount (100+100+200)*2, due to the duplication caused by the presence of two rows in Budgets for Account1.

In the prior art, the correct results can be obtained by using 2 separate queries.

In this case the SQL queries are as follows, with the appropriate results being shown in Tables 4 and 5 below.

| | |
|---|---|
| select account.name Account, sum(sales) from account, sales where account.id = sales.accid group by account.name | select account.name Account, sum(budget) from account, budgetx where account.id = budgetx.accid group by account.name |

TABLE 4

| ACCOUNT   | SUM (SALES) |
|-----------|-------------|
| Account 1 | 400         |
| Account 2 | 130         |
| Account 3 | 200         |
| Account 4 | 300         |

[4 rows only selected]

TABLE 5

| ACCOUNT   | SUM (BUDGET) |
|-----------|--------------|
| Account 1 | 400          |
| Account 2 | 100          |
| Account 3 | 750          |
| Account 4 | 200          |

[4 rows only selected]

The result the user is looking for in the combined query is the combination of these single table result sets. What is actually happening, however, when the user selects aggregations from two or more detail tables, is that the SQL causes all the tables to be joined together (giving all possible combinations from the joins) and only THEN causes the aggregation to be performed. This is in contrast to the correct procedure which would be to do the aggregations separately for each detail table and THEN do the join(s).

A second example of queries which can also yield misleading results, are when aggregation is performed at both the master and detail table levels.

Returning to the table arrangements shown in FIG. 3. In this example an order shown in the order table 14 can consist of many orderlines which are included in the orderline table 15. An example of suitable order and orderline tables are shown in Tables 6 and 7 respectively.

TABLE 6

| ID | ORDER   | VALUE |
|----|---------|-------|
| 1  | Order 1 | 300   |
| 2  | Order 2 | 200   |
| 3  | Order 3 | 400   |

[3 rows only selected]

TABLE 7

| ID | ORDERID | PRICE |
|----|---------|-------|
| 1  | 1       | 100   |
| 2  | 1       | 200   |
| 3  | 2       | 50    |
| 4  | 2       | 50    |
| 5  | 2       | 100   |
| 6  | 3       | 400   |

[6 rows only selected]

In this example, if the user wanted to compare Order totals with the aggregated Order Item totals, they would pick items corresponding to the Order number and Value from the Orders table, and Price from the OrderLines table.

Figure 5:
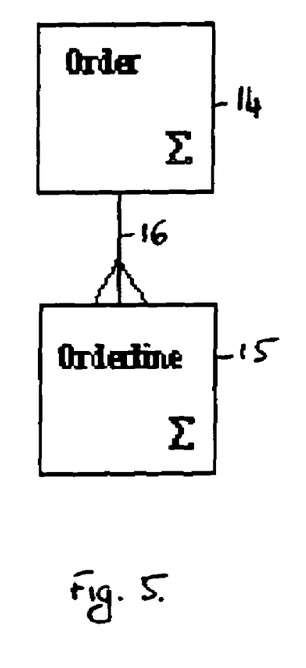
FIG. 5 is a schematic representation of a second query according to the prior art.

As before, normal SQL generation will cause the processor 3 to first join the order and orderline tables 14, 15 (to give all the combinations) and then aggregate the combined rows. This query, which is set out below, and is shown in FIG. 5 leads to the generation of the following (unexpected) results shown in Table 8:

select name,sum(value), sum(price) from orderx, orderline where orderx.id=orderline.orderid group by name

TABLE 8

| ORDER | SUM (VALUE) | SUM (PRICE) |
|---|---|---|
| Order 1 | 600 | 300 |
| Order 2 | 600 | 200 |
| Order 3 | 400 | 400 |

[3 rows only selected]

Operation of the system in accordance with the present invention will now be described.

When a query involves either of the above scenarios, or any combination of them, the scenario will be detected by the processor 73. This is achieved by having the processor 73 monitor for the selection of items which requires the aggregation of data in two different tables which are joined. When such an input is detected the processor is adapted to modify the SQL generated. In this case the SQL generated causes the processor 3 to use inline views (implemented as transient complex folders) to ensure that aggregation is done at the correct level.

Figure 6:
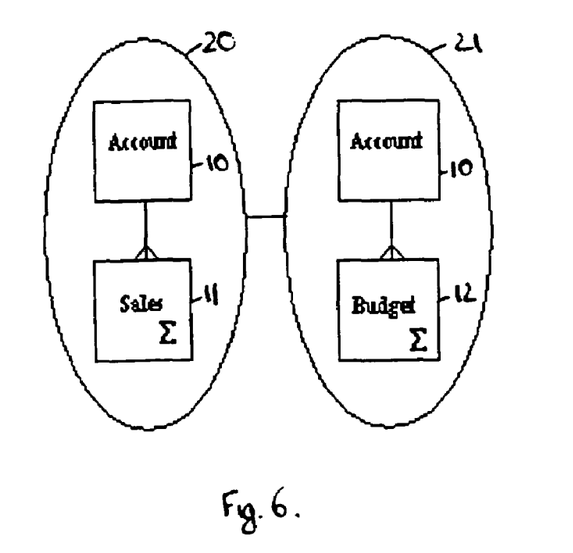
FIG. 6 is a schematic representation of a first query generated according to the present invention; and, FIG. 7 is a schematic representation of a second query generated in accordance with the present invention.

In the first example outlined above, two inline views 20, 21 are used as shown in the graphical representation of the query in FIG. 6. Each inline view 20, 21 includes a respective master-detail aggregation of the accounts and sales tables 10, 11 and the accounts and budget tables 10, 12, respectively as shown. Once the aggregations have been completed within the inline views 20, 21, the joining of the tables can be implemented, based on the master key(s) to give the desired results.

Since the aggregation is done inside the inline views, which have single fact tables, the aggregations will be at the correct level and are effectively performed on each of the sales table 11 and the budget table 12 respectively. This is because combining each of the detail tables 11, 12 with the master table 10 effectively selects the rows of the tables 11, 12 on which the aggregation is performed. Thus, for Account 1, the inline views 20, 21 cause the aggregation to be performed on each row relating to Account 1 in the respective sales and budget tables 11, 12, respectively.

The actual query generated is as follows:

```
SELECT in403 as Account , SUM(in397) as Sales_SUM , SUM(in417)
as Budget_SUM
FROM
    (SELECTi111184 AS in407, SUM(i111193) AS in417
    FROM
        (SELECT ID AS i111184, NAME AS i111185 FROM
        DEMO.ACCOUNT) IO111183,
        (SELECT ID AS i111191, ACCID AS i111192, BUDGET AS
        i111193 FROM DEMO.BUDGET) IO111190
    WHERE (i111184 = i111192(+))
    GROUP BY i111184) on405,
    (SELECT i111184 AS in385, SUM(i111208) AS in397, i111185 AS
    in403
    FROM
        (SELECT ID AS i111184, NAME AS i111185 FROM
        DEMO.ACCOUNT) IO111183,
        ( SELECT ID AS i111206, ACCID AS i111207, SALES AS
        i111208 FROM DEMO.SALES) IO111205
    WHERE (i111184 = i111207(+))
    GROUP BY i111185, i111184) on383
WHERE ((in385 = in407))
GROUP BY in403;
```

Once the join is complete, this results in the output of the information shown in Table 9 from the database 2.

TABLE 9

| ACCOUNT | SALES_SUM | BUDGET_SUM |
|---|---|---|
| Account 1 | 400 | 400 |
| Account 2 | 130 | 100 |
| Account 3 | 200 | 750 |
| Account 4 | 300 | 200 |

[4 rows only selected]

Figure 7:
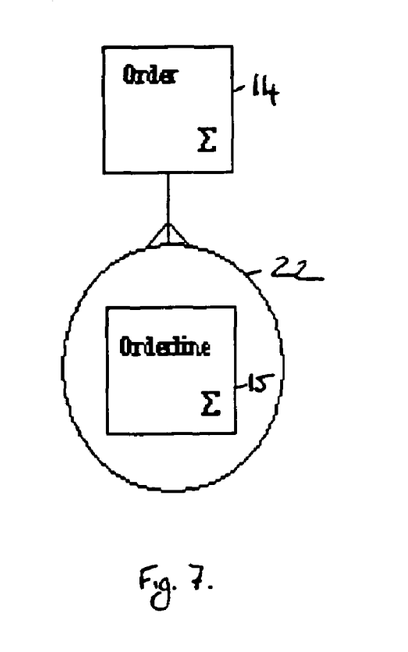

Similarly with the second example, the generated query is adapted using inline views. In this case, the query, shown in detail below, causes a single inline view 22 to be formed including the orderline table. The orderline table is then aggregated before being joined to the order table.

The output results are shown in table 10 below.

```
SELECT i111202 as Order, SUM(i111203) as Order_SUM, SUM(in592)
as Orderline_SUM
FROM
    (SELECT SUM(i111198) AS in592, i111197 AS in600
    FROM
        (SELECT ID AS i111196, ORDERID AS i111197, PRICE AS
        i111198 FROM DEMO.ORDERLINE) IO111195
    GROUP BYi111197) on590,
    (SELECT ID AS i111201, NAME AS i111202, VALUE AS i111203
    FROM DEMO.ORDER) o111200
WHERE ((i111201 = in600))
GROUP BY i111202;
```

TABLE 10

| ORDER | ORDER_SUM | ORDERLINE_SUM |
|---|---|---|
| Order 1 | 300 | 300 |
| Order 2 | 200 | 200 |
| Order 3 | 400 | 400 |

[3 rows only selected]

It will therefore be realised that the present invention operates to automatically overcome the problems of the prior art by generating a modified SQL which in turn causes the generation of inline views. The inline views can then be used to control the level at which the aggregation is performed, thereby ensuring that the aggregation is performed before the tables are joined.

It will also be realised that the present invention may be implemented at a single location within the database. In this example, the query generator would be included within an end station which includes the database, or the database center and accordingly, need not be run located at remote end stations. In this case, the processor of the query generator could also constitute the processor of the database itself. Further options include for the query generator to be located at the database with the indication of the selected items selected on the end station 7 being transferred via the communications network 6 to the processor of the database to allow the database processor to generate the query and then obtain the data as required.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

We claim:

1. A query generator for generating a query for obtaining selected data from a database, the database having a number of detail tables in which data is stored, the query generator comprising a processor which is coupled to the database in use, the processor being adapted to:
   a. receive an input indicating the selected data to be obtained to generate a first query;
   b. analyze the input and determine whether the input requires a joining of data in a plurality of different detail tables, and an aggregation step; and,
   c. if it is determined the input requires a joining of data in a plurality of different detail tables, causing the processor to modify the content of the first query indicating the selected data to be obtained to generate a second query, the second query being adapted to cause the database to:
      i. aggregate the data within each of the plurality of detail tables as required; and,
      ii. perform a SQL join operation to join the aggregated data from each of the plurality of detail tables, the joined aggregated data representing the selected data.

2. A query generator according to claim 1, wherein the second query causes the database to aggregate the data for each table by causing the database to:
   i. select the data within the table for aggregation; and,
   ii. aggregate the data.

3. A query generator according to claim 2, wherein the data is selected by implementing complex folders to generate inline views within the database, the inline views being maintained until the aggregation is completed.

4. A query generator according to claim 1, wherein the aggregation comprises at least one of: generating an average of the data, generating a sum of the data, generating a standard deviation of the data, and generating an evaluation of either a maximum or a minimum of the data.

5. A query generator according to claim 1, the query generator further comprises an input device coupled to the processor to allow a user to generate the input.

6. A query generator according to claim 5, wherein the input is generated by selecting items from a list of possible items, each item representing data contained within a respective database table, an action to be performed on data within the database, or both data contained within a respective database table and an action to be performed on data within the database.

7. A query generator according to claim 1, wherein the first query and the second query being generated as SQL queries.

8. A query generator according to claim 1, wherein the aggregation step requires the aggregation of data in different tables.

9. A database system, the database system comprising: a. a database, the database comprising:
   i. a store for storing data, the store having a number of detail tables; and,
   ii. a database processor coupled to the store for obtaining data in accordance with a received query; and,
   b. a query generator for generating a structured query for obtaining selected data from the database, the query generator comprising a processor adapted to:
      i. receive an input representing a first structured query to be generated;
      ii. analyze the input and determine whether the input requires a joining of data in a plurality of different detail tables, and an aggregation step; and,
      iii. if the input requires a joining of data in a plurality of different detail tables, causing the processor to modify the content of the first query indicating the selected data to be obtained to generate a second structured query,
   wherein the database processor responds to the second structured query to:
      (1) aggregate the data within each of the plurality of detail tables as required; and,
      (2) perform a SQL join operation to join the aggregated data from each of the plurality of detail tables, the joined aggregated data representing the selected data.

10. A system according to claim 9, wherein the database processor and the processor of the query generator are a same processor.

11. A system according to claim 9, wherein the database processor aggregates the data for each table by:
    i. selecting the data within the table for aggregation; and,
    ii. aggregating the data.

12. A system according to claim 11, wherein the database processor selects the data by implementing an inline view to generate complex folders within the database, the complex folders being maintained until the aggregation is completed.

13. A system according to claim 9, wherein the aggregation comprises at least one of: generating an average of the data, generating a sum of the data, generating a standard deviation of the data, and generating a maximum and a minimum evaluation of the data.

14. A system according to claim 9, the query generator further comprising an input device coupled to the processor of the query generator to allow a user to generate the input.

15. A system according to claim 14, wherein the input is generated by selecting items from a list of possible items, each item representing data contained within a respective database table, an action to be performed on data within the database, or both data contained within a respective database table and an action to be performed on data within the database.

16. A query generator for generating a query for obtaining selected data from a database, the database having a number of detail tables in which data is stored, the query generator comprising a processor which is coupled to the database in use, the processor being adapted to:
    a. receive an input indicating the selected data to be obtained to generate a first query;
    b. analyze the input and determine whether the input requires a joining of data in a plurality of different detail tables, and an aggregation step; and,
    c. if it is determined the input requires a joining of data in a plurality of different detail tables, causing the processor to modify the content of the first query indicating the selected data to be obtained to generate a second query, the second query being adapted to cause the database to:
       i. aggregate the data within each of the plurality of detail tables as required; and,
       ii. perform a SQL join operation to join the aggregated data from each of the plurality of detail tables, the joined aggregated data representing the selected data;
    wherein the data is selected by implementing complex folders to generate inline views within the database, the inline views being maintained until the aggregation is completed.

17. A computer program product for generating a query for obtaining selected data from a database, the database having a number of detail tables in which data is stored, comprising:
- a computer readable medium;
- computer program instructions, recorded on the computer readable medium, executable by a processor, for performing the steps of:
  a. receiving an input indicating the selected data to be obtained to generate a first query;
  b. analyzing the input and determine whether the input requires a joining of data in a plurality of different detail tables, and an aggregation step; and,
  c. if it is determined the input requires a joining of data in a plurality of different detail tables, causing the processor to modify the content of the first query indicating the selected data to be obtained to generate a second query, the second query being adapted to cause the database to:
     i. aggregate the data within each of the plurality of detail tables as required; and,
     ii. perform a SQL join operation to join the aggregated data from each of the plurality of detail tables, the joined aggregated data representing the selected data.

18. The computer program product of claim 17, wherein the second query causes the database to aggregate the data for each table by causing the database to:
   i. select the data within the table for aggregation; and,
   ii. aggregate the data.

19. The computer program product of claim 18, wherein the data is selected by implementing complex folders to generate inline views within the database, the inline views being maintained until the aggregation is completed.

20. The computer program product of claim 17, wherein the aggregation comprises at least one of: generating an average of the data, generating a sum of the data, generating a standard deviation of the data, and generating an evaluation of either a maximum or a minimum of the data.

* * * * *

UNITED STATES PATENT AND TRADEMARK OFFICE
CERTIFICATE OF CORRECTION

PATENT NO. : 7,467,152 B2  Page 1 of 1
APPLICATION NO. : 09/730826
DATED : December 16, 2008
INVENTOR(S) : Kearsey et al.

It is certified that error appears in the above-identified patent and that said Letters Patent is hereby corrected as shown below:

In column 5, line 51, delete "Account1" and insert -- Account 1 --, therefor.

In column 5, line 54, delete "Account1." and insert -- Account 1. --, therefor.

In column 7, line 1, delete "name,sum(value)," and insert -- name, sum(value), --, therefor.

Signed and Sealed this

Twenty-seventh Day of April, 2010

David J. Kappos
*Director of the United States Patent and Trademark Office*